(12) United States Patent
Takahashi

(10) Patent No.: US 8,526,021 B2
(45) Date of Patent: Sep. 3, 2013

(54) SERVER, CONTROL METHOD THEREOF AND STORAGE MEDIUM FOR ASSISTING IMAGE PROCESSING APPARATUS IN ERROR RECOVERY

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 12/709,631

(22) Filed: Feb. 22, 2010

(65) Prior Publication Data

US 2010/0231944 A1 Sep. 16, 2010

(30) Foreign Application Priority Data

Mar. 16, 2009 (JP) ................................. 2009-063237

(51) Int. Cl.
*G06F 3/12* (2006.01)
(52) U.S. Cl.
USPC ........................................................ 358/1.13
(58) Field of Classification Search
None
See application file for complete search history.

(56) References Cited

U.S. PATENT DOCUMENTS

| 5,493,408 | A * | 2/1996 | Kurogane et al. | 358/296 |
| 7,653,839 | B2 | 1/2010 | Takahashi | 714/47 |
| 2002/0089692 | A1 * | 7/2002 | Ferlitsch | 358/1.15 |
| 2004/0194011 | A1 | 9/2004 | Matsumura | |
| 2004/0263896 | A1 * | 12/2004 | Nagata et al. | 358/1.14 |
| 2006/0048019 | A1 | 3/2006 | Takahashi | 714/47 |
| 2006/0224606 | A1 * | 10/2006 | Sedky et al. | 707/101 |
| 2008/0068640 | A1 | 3/2008 | Todaka | |

FOREIGN PATENT DOCUMENTS

| JP | 08-097952 A | 4/1996 |
| JP | 2003305928 A | 10/2003 |
| JP | 2004288067 A | 10/2004 |
| JP | 2006-246445 A | 9/2006 |
| JP | 2007-243456 A | 9/2007 |
| JP | 2008078759 A | 4/2008 |

* cited by examiner

*Primary Examiner* — Jeremiah Bryar
(74) *Attorney, Agent, or Firm* — Fitzpatrick, Cella, Harper & Scinto

(57) ABSTRACT

In an information processing system, in which a server and an image processing apparatus are connected via a network, the server determines whether or not a processing request is after an occurrence of an error if there is the processing request from a multi function peripheral, and specifies a multi function peripheral, in which the error has occurred, and a cause of the error if the processing request is after the occurrence of the error. The server defines a flow of a process in accordance with the processing request based on the multi function peripheral and the cause of the error, and transmits UI information for instructing the execution of the defined process to the multi function peripheral. As a result, the multi function peripheral executes a process corresponding to the processing request in accordance with the defined process based on the information instructed by the user based on the UI information.

8 Claims, 16 Drawing Sheets

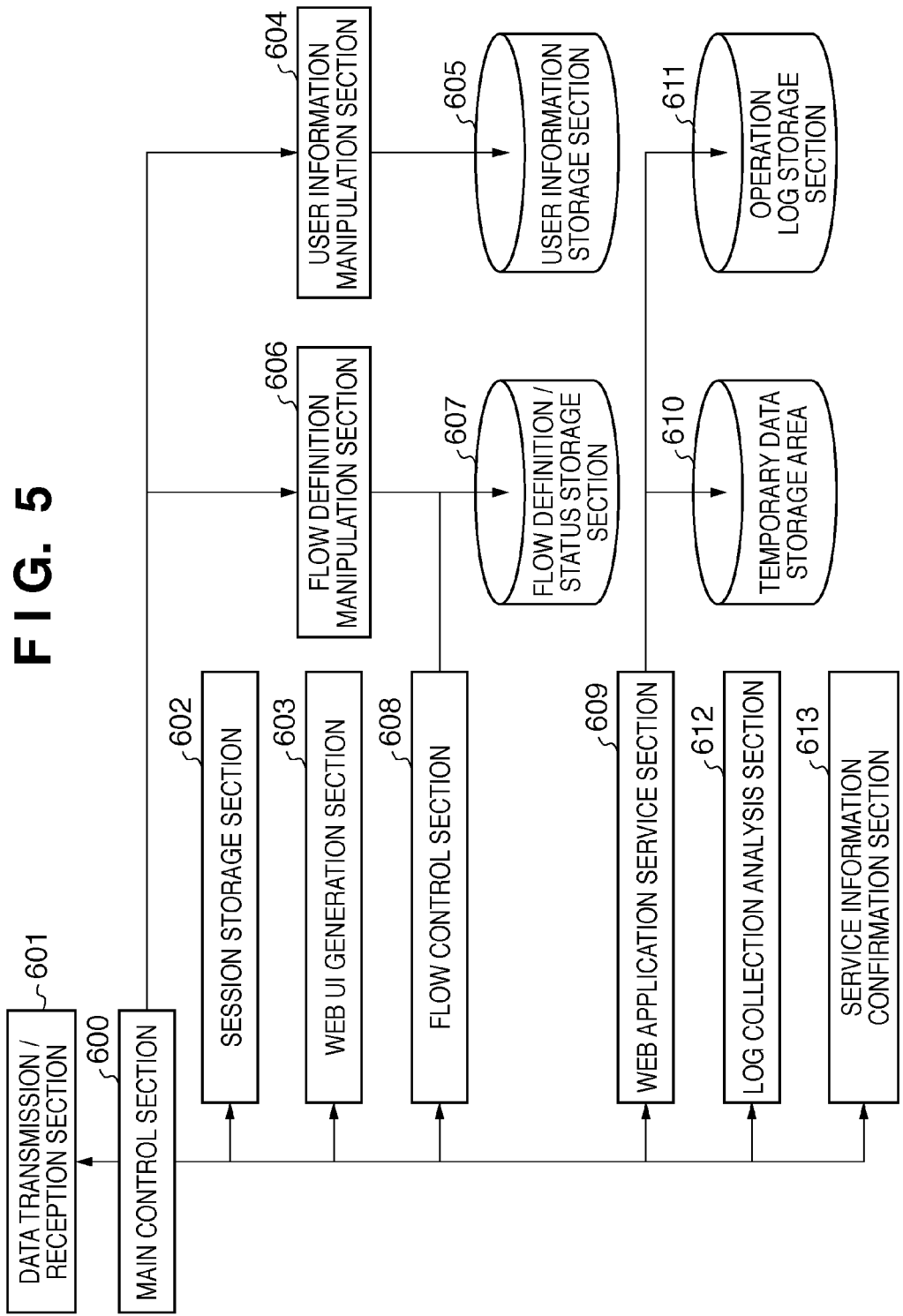

FIG. 6

```
<flow>
  <service order=1 protocol="WS">
    <location type="MFP" / >
    <name ="SCAN" / >
    <input name="size" type="String">A4</ / input>
    <input name="resolution" type="String">auto</ / input>          }705  }701
    <output name="result" type="BoxFiles">Box1¥scan*.tiff</ / output>
  </ service>
                                                                       706
  <service order=2 protocol="WS">
    <location type="MFP" / >
    <name ="RemovingBlackSpot" / >
    <input name="original" type="BoxFiles">Box1¥scan*.tiff</ / input>    }702
    <output name="result" type="Files" >¥¥WebServer_1¥SF¥result*.tiff</ / output>
  </ service>                                                            }703
  <service order=3 protocol="WS">
    <location type="Server">WebServer_1</ / location>
    <name ="OCR" / >
    <input name="original" type="Files">¥¥WebServer_1¥SF¥result*.tiff</ / input>
    <output name="result" type="Files">¥¥WebServer_1¥SF¥ocr¥ocr*.txt</ / output>
  </ service>
  <service order=4 protocol="WS">
    <location type="Server">WebServer_1</ / location>
    <name ="SAVE" / >
    <input name="file" type="Files">¥¥WebServer_1¥SF¥ocrResult¥ocr*.txt</ / input>
    <output name="extText" type="Files">Result¥Folder1¥ocr*.txt</ / output>
  </ Service>
</ flow>
                                                                              704
```

FIG. 9

| PROCESS NAME | OCCURRENCE TIME | TARGET DATA | SEQUENCE ID | RESULT | CAUSE CODE | DETAIL |
|---|---|---|---|---|---|---|
| OCR | 2008/10/1 11:22:30.022 | Result1.tiff | 10 | SUCCESS | - | - |
| OCR | 2008/10/1 11:22:32.510 | Result2.tiff | 10 | FAILURE | 2 | COLOR IMAGE CANNOT BE PROCESSED |
| OCR | 2008/10/1 11:22:33.012 | Result3.tiff | 10 | SUCCESS | - | - |
| OCR | 2008/10/1 11:22:33.926 | output001.tiff | 11 | FAILURE | -1 | COMMUNICATION ERROR HAS OCCURRED |

F I G. 10

| CAUSE CODE | CAUSE LIST |
|---|---|
| −1 | Unknown |
| 1 | Not Color |
| 2 | Not Black&White |
| 4 | Too Big Size |
| 8 | Too Small Size |
| 16 | Too High Resolution |
| 32 | Too Low Resolution |
| 64 | Not PDF |
| 128 | Not Image |

FIG. 16

```
<flow>
  <service order=1 protocol="WS">                    ⎫
    <location type="MFP" / >                         ⎪
    <name ="SCAN" / >                                ⎪
    <input name="size" type="String">A4</ input>     ⎬ 1701
    <input name="resolution" type="String">auto</ input>  ← 1705
    <input name="Color Mode">Black & White</ input>
    <output name="result" type="BoxFiles">Box1¥scan2.tiff</ output>
  </ service>                                        ⎭
                                                  1706
  <service order=2 protocol="WS">                    ⎫
    <location type="MFP" / >                         ⎪
    <name ="RemovingBlackSpot" / >                   ⎪
    <input name="original" type="BoxFile">Box1¥scan2.tiff</ input>  ⎬ 1702
    <output name="result" type="File">¥¥WebServer_1¥SF¥result2.tiff</ output>
  </ service>                                        ⎭ 1703
  <service order=3 protocol="WS">                    ⎫
    <location type="Server">WebServer_1</ location>  ⎪
    <name ="OCR" / >                                 ⎬
    <input name="original" type="File">¥¥WebServer_1¥SF¥result2.tiff</ input>
    <output name="result" type="File">¥¥WebServer_1¥SF¥ocr¥ocr2.txt</ output>
  </ service>                                        ⎭
  <Service order=4 protocol="WS">                    ⎫
    <location type="Server">WebServer_1</ location>  ⎪
    <name ="SAVE" / >                                ⎬
    <input name="file" type="Files">¥¥WebServer_1¥SF¥ocrResult¥ocr*.txt</ input>
    <output name="extText" type="Files">Result¥Folder1¥ocr*.txt</ output>
  </ Service>                                        ⎭
</ flow>
                                                                        1704
```

SERVER, CONTROL METHOD THEREOF AND STORAGE MEDIUM FOR ASSISTING IMAGE PROCESSING APPARATUS IN ERROR RECOVERY

BACKGROUND OF THE INVENTION

1. Field of the Invention

The present invention relates to an information processing system and a server, in which at least a server and an image processing apparatus are connected via a network and the server and the image processing apparatus cooperate to execute a process, and a control method thereof.

2. Description of the Related Art

In recent years, a multi function peripheral having functions of a scanner, a printer, a copier, a facsimile, etc., is also becoming web-compliant. For example, there is a multi function peripheral that includes a web browser that can access a web server through operation of the browser from a console panel of the multi function peripheral to reference or print a folder or a document of the server.

In offices, a network system is proposed that can define a processing flow with a combination of a plurality of various services provided by a multi function peripheral or a web server to simplify the user operation. In such a system, a plurality of devices connected to the network can process data inputted through operations, such as scanning and FAX reception, in the multi function peripheral. When a plurality of devices execute a plurality of processes, an error may occur in one of the processes. For example, if the processes are again executed from the beginning when an error occurs after the completion of some of the processes, the processes carried out up to that point are rendered useless, and the convenience of the user is impaired. Therefore, a function for saving the data of the job, in which an error has occurred, in the multi function peripheral and for allowing the restart of the job later by an instruction of the user is desired. For example, an image forming apparatus of Japanese Patent Laid-Open No. 2003-305928 can save the data being printed in the multi function peripheral, not only when there is an error during the execution of a print job, but also when a cancel instruction of printing is inputted from a console panel. The user can instruct the restart of the print job.

Japanese Patent Laid-Open No. 2008-078759 proposes a system for saving data generated so far when an error occurs during the execution of a job, and the data is intended to be reused. An electronic signature is provided and saved in the multi function peripheral to improve the security of the data. Japanese Patent Laid-Open No. 2004-288067 proposes a system for realizing a process in which a plurality of services are associated. In the system, when a service is infeasible during the execution of services that constitute the process, the infeasible service and the subsequent services are associated and processed.

In conventional techniques, the processing flow is intended to be restarted, and intermediate data generated so far is saved to allow the execution of the "infeasible service" and the "subsequent services". However, if the problem causing the error is in the input data, the intermediate data cannot be reused, and first input operations, such as rescanning, usually need to be performed again. However, scanning of paper (document) is a cumbersome operation, and it is inefficient to scan the paper every time an error occurs.

There is a case that not all intermediate data is problematic, and the problem can be solved if only part of the data is replaced. In that case, the stored intermediate data may be manually replaced to restart the process. However, a manual operation is necessary to identify the replacing data and the reused data or to prepare for the restart of the process. Therefore, a complicated operation is required, and there is a high risk of confusing the user.

Furthermore, the operating multi function peripheral may not have the capability. For example, if there is a process that requires data with more than a certain resolution or color data, the multi function peripheral that does not have the capability to generate data adapted to the processing conditions cannot restart the process even if the data is replaced. Therefore, there is a problem in that an error cannot be solved simply by restarting the process using the saved intermediate data upon the restart of the process, or the convenience is impaired, when an error occurs in the processing flow.

SUMMARY OF THE INVENTION

An aspect of the present invention is to eliminate the above-mentioned problems with the conventional technology.

The feature of the present invention is in that a user can easily restart a process when an error occurs while a server and an image processing apparatus cooperate to execute the process.

The feature of the present invention is to determine the conditions for restarting the process in accordance with the error and present suitable restart conditions to the user to allow the user to restart the process without confusion.

According to an aspect of the present invention, there is provided a server connected to an image processing apparatus via a network, for performing a process in cooperation with the image processing apparatus, the server comprises: a storage unit that stores flow definition information defining a flow of the process executed in cooperation with the image processing apparatus; a transmission unit that determines whether or not a processing request is after an occurrence of an error if there is a processing request from the image processing apparatus, and transmits, to the image processing apparatus, UI information for instructing the execution of the process in accordance with the flow definition information stored in the storage unit, which defines the flow of the process according to the processing request if the processing request is not after the occurrence of the error; an execution control unit that controls the server and the image processing apparatus to cooperate to execute the process in accordance with the flow definition information; a specifying unit that specifies an apparatus in which the error has occurred and a cause of the error, if the processing request after the occurrence of the error is received from the image processing apparatus; a flow definition unit that defines the flow of the process in accordance with the processing request after the occurrence of the error based on the apparatus in which the error has occurred, and the cause of the error specified by the specifying unit; a UI transmission unit that transmits UI information for instructing the execution of the process defined in the flow definition unit to the image processing apparatus; and a control unit that controls the execution of the process corresponding to the processing request after the occurrence of the error in accordance with the process defined in the flow definition unit in accordance with the information instructed by the image processing apparatus based on the UI information.

According to an aspect of the present invention, there is provided a control method of an information processing system in which at least a server and an image processing apparatus are connected via a network, and the server and the image processing apparatus cooperate to execute a process, the control method comprises: a determination step for the server to determine whether or not a processing request is after an occurrence of an error if there is a processing request from the image processing apparatus; a transmission step of transmitting, from the server to the image processing apparatus, UI information which is for instructing the execution of the process in accordance with flow definition information defining a flow of the process according to the processing request, if it is determined in the determination step that the processing request is not after the occurrence of the error; an execution control step for the server to control so that the server and the image processing apparatus cooperate to execute the process in accordance with the flow definition information; a specifying step for the server to specifying an apparatus in which the error has occurred and a cause of the error if it is determined in the determination step that the processing request after the occurrence of the error is received from the image processing apparatus; a flow definition step for the server to define the flow of the process in accordance with the processing request after the occurrence of the error based on the apparatus in which the error has occurred, and the cause of the error specified in the specifying step; a UI transmission step for the server to transmit UI information for instructing the execution of the process defined in the flow definition step to the image processing apparatus; an issuance step for the image processing apparatus to cause the user to input an instruction based on the UI information to issue a processing request to the server in accordance with the instruction of the user; and a control step for the server to control the execution of the process corresponding to the processing request after the occurrence of the error in accordance with the process defined in the flow definition step based on the information instructed by the image processing apparatus based on the UI information.

Further features and aspects of the present invention will become apparent from the following description of exemplary embodiment, with reference to the attached drawings.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 5 is a configuration diagram of software that controls the entire information processing system and that operates on the server according to the embodiment;

FIG. 6 depicts a view illustrating an example of flow definition information of the information processing system according to the embodiment;

FIG. 9 depicts a view illustrating an example of an operation log that can be obtained from the services in the information processing system according to the present embodiment;

FIG. 10 depicts a view illustrating an example of a list of cause codes that can be obtained as an operation log of the information processing system according to the embodiment;

FIG. 16 depicts a view illustrating an example of data replacement flow definition information in the information processing system according to the embodiment of the present invention.

DESCRIPTION OF THE EMBODIMENTS

Embodiment of the present invention will now be described hereinafter in detail, with reference to the accompanying drawings. It is to be understood that the following embodiment are not intended to limit the claims of the present invention, and that not all of the combinations of the aspects that are described according to the following embodiment are necessarily required with respect to the means to solve the problems according to the present invention.

Figure 1:
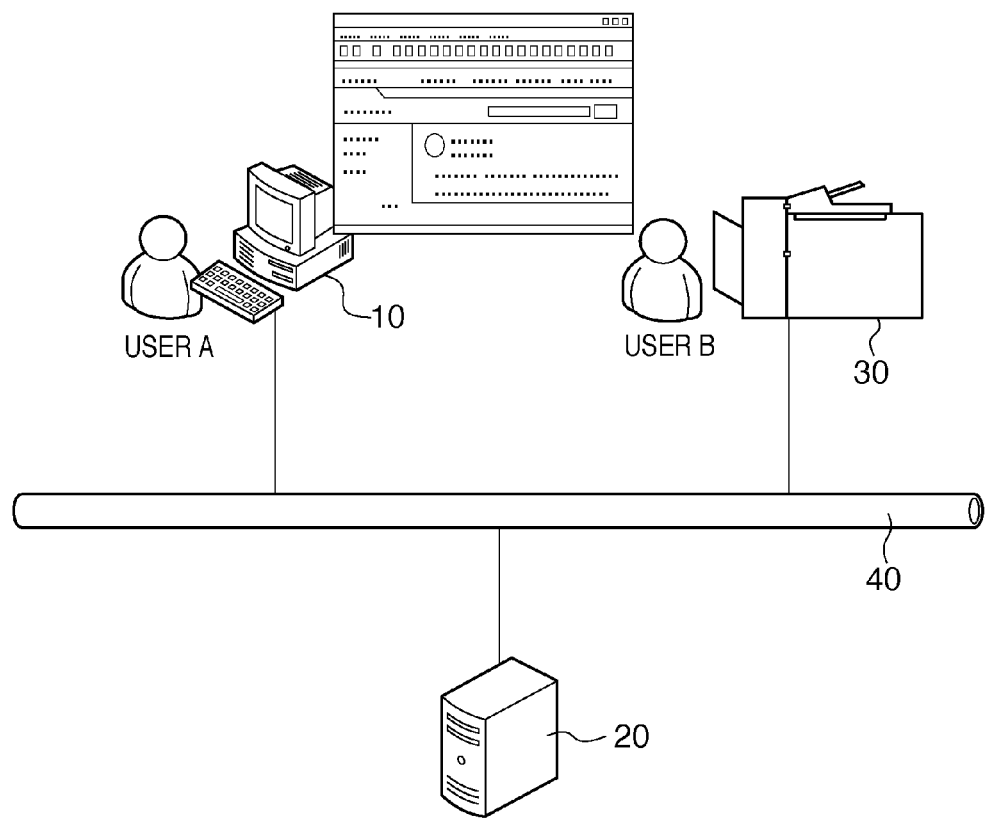
FIG. 1 is a configuration diagram of an information processing system according to an embodiment of the present invention.

FIG. 1 is a configuration diagram of a processing flow execution system (information processing system) according to the embodiment of the present invention. The system can cooperatively process a plurality of services for executing various processes for, for example, image data (or document data) inputted from a multi function peripheral 30. The services include printing, scanning, FAX transmission/reception, copying, email transmission/reception, and storage (filing).

The system includes a web application server 20 (hereinafter, server) that executes a web application, a client PC (hereinafter, PC) 10 for accessing via a browser, and the multi function peripheral 30, which are connected to each other via a network 40. Although only these devices are illustrated herein, it is obvious that the present invention can include many other devices such as scanners, printers, and PCs.

In the information processing system according to the present embodiment, a user A of the PC 10 makes access via a browser of the PC 10, and a user B of the multi function peripheral 30 makes access via an operation panel of the multi function peripheral 30. However, dedicated client applications not shown may be arranged on the PC 10 and the multi function peripheral 30, and the users A and B may execute the applications. In that case, the server 20 may be a simple application server. Therefore, in the present embodiment, an information processing system will be described, in which at least the server 20 and the image processing apparatus (MFP) 30 are connected via the network 40, and the server 20 and the image processing apparatus (multi function peripheral) 30 or the PC 10 cooperate to execute the process.

Figure 2:
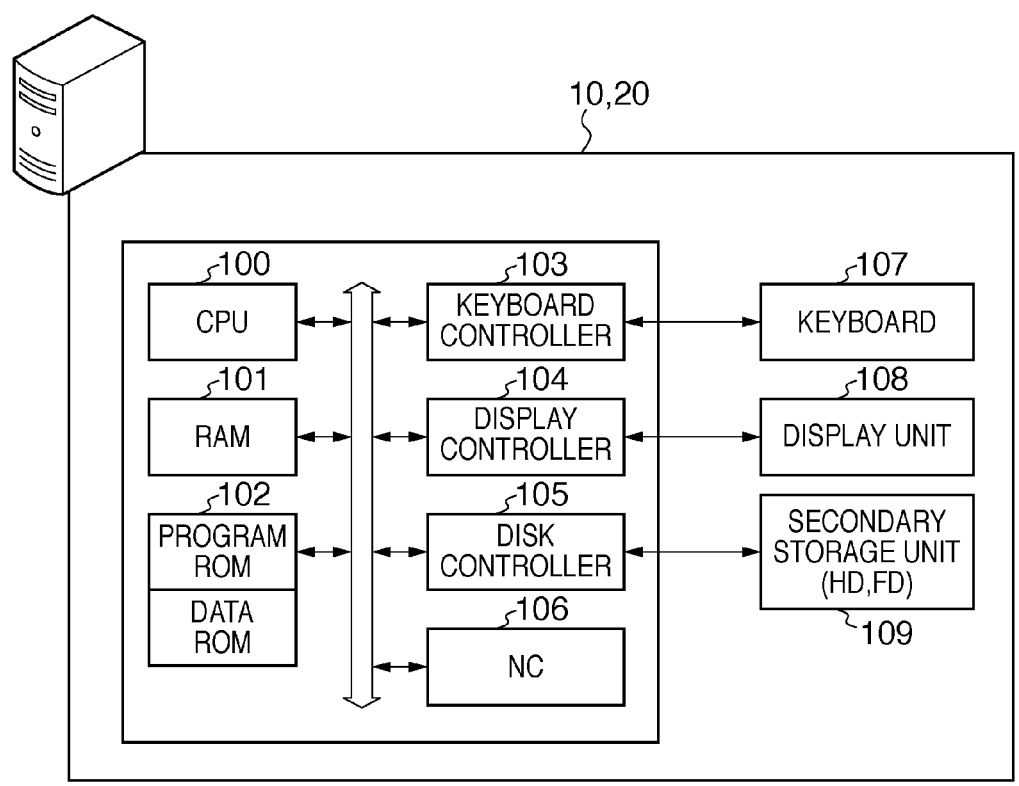
FIG. 2 is a block diagram describing a configuration of a PC and a server according to the embodiment.

FIG. 2 is a block diagram describing a hardware configuration of the PC 10 and the server 20 according to the embodiment of the present invention. The hardware configuration is equivalent to a hardware configuration of a general information processing apparatus (PC), and a hardware configuration of a general information processing apparatus can be applied to the client PC 10 and the server 20 of the present embodiment.

A CPU 100 executes programs of an OS, an application, etc., stored in a program ROM of a ROM 102 or loaded from a secondary storage unit 109, such as a hard disk, to a RAM 101. The ROM 102 further includes a data ROM that stores various setting values, etc. OS is an abbreviation of an operating system operating on a computer. Processes of flow charts described below can be realized by executing programs loaded to the RAM 101. The RAM 101 functions as a main memory, a work area, etc., of the CPU 100. A keyboard controller 103 controls input from a keyboard 107 and a pointing device not shown. A display controller 104 controls display to a display unit (display unit) 108. A disk controller 105 controls data access to a secondary storage unit 109, such as a hard disk (HD) and a floppy (registered trademark) disk (FD), which stores various data. An NC 106 is connected to the network 40 and executes a communication control process with other devices connected to the network 40.

Figure 3:
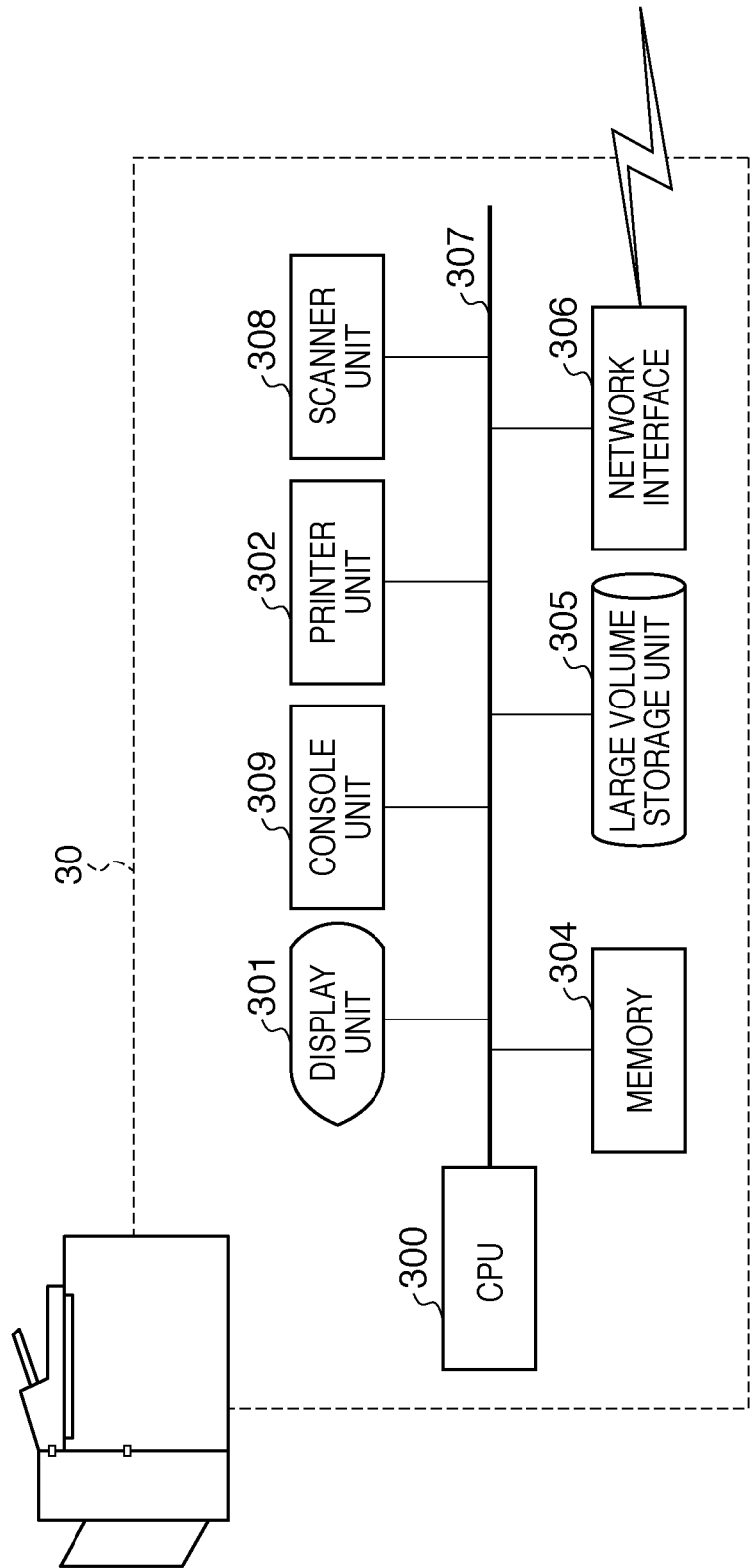
FIG. 3 is a block diagram describing a hardware configuration of a multi function peripheral according to the embodiment.

FIG. 3 is a block diagram describing a hardware configuration of the multi function peripheral 30 according to the present embodiment. The hardware configuration shown in FIG. 3 is equivalent to a hardware configuration of a general multi function peripheral and can be applied as the multi function peripheral of the present embodiment.

A CPU 300 controls operation of the entire multi function peripheral 30. The CPU 300 is connected to a scanner unit 308 and a printer unit 302 to realize functions of scanning, printing, etc. The CPU 300 is also connected to external devices, such as other multi function peripherals and PCs, via the network 40 to realize data transmission/reception. The CPU 300 is also connected to a PSTN to realize FAX functions. The CPU 300 is connected to a console unit 309 as an interface for providing the functions to the user. If the console unit 309 comprises a touch panel, the console unit 309 and the display unit 301 are integrally constituted. A memory 304 includes a RAM and a ROM, and the RAM is used as a system work memory for the CPU 300 to operate. A large volume storage unit 305 stores an OS and various applications. Programs stored in the large volume storage unit 305 are loaded to the RAM of the memory 304 for execution and executed under the control of the CPU 300. A network interface unit 306 is connected to the network 40 and inputs/outputs information to and from external devices, such as other multi function peripherals and PCs, connected to the network 40. The system supports TCP/IP as a network communication protocol and communicates with external devices in accordance with the TCP/IP communication protocol. A system bus 307 connects the CPU 300 and the components described above.

A method of notifying the fact that there is an edit of data, etc., to the user at the restart of a job, which is a feature of the present embodiment, is carried out by displaying a message on the display unit 301 of the console unit 309.

Figure 4:
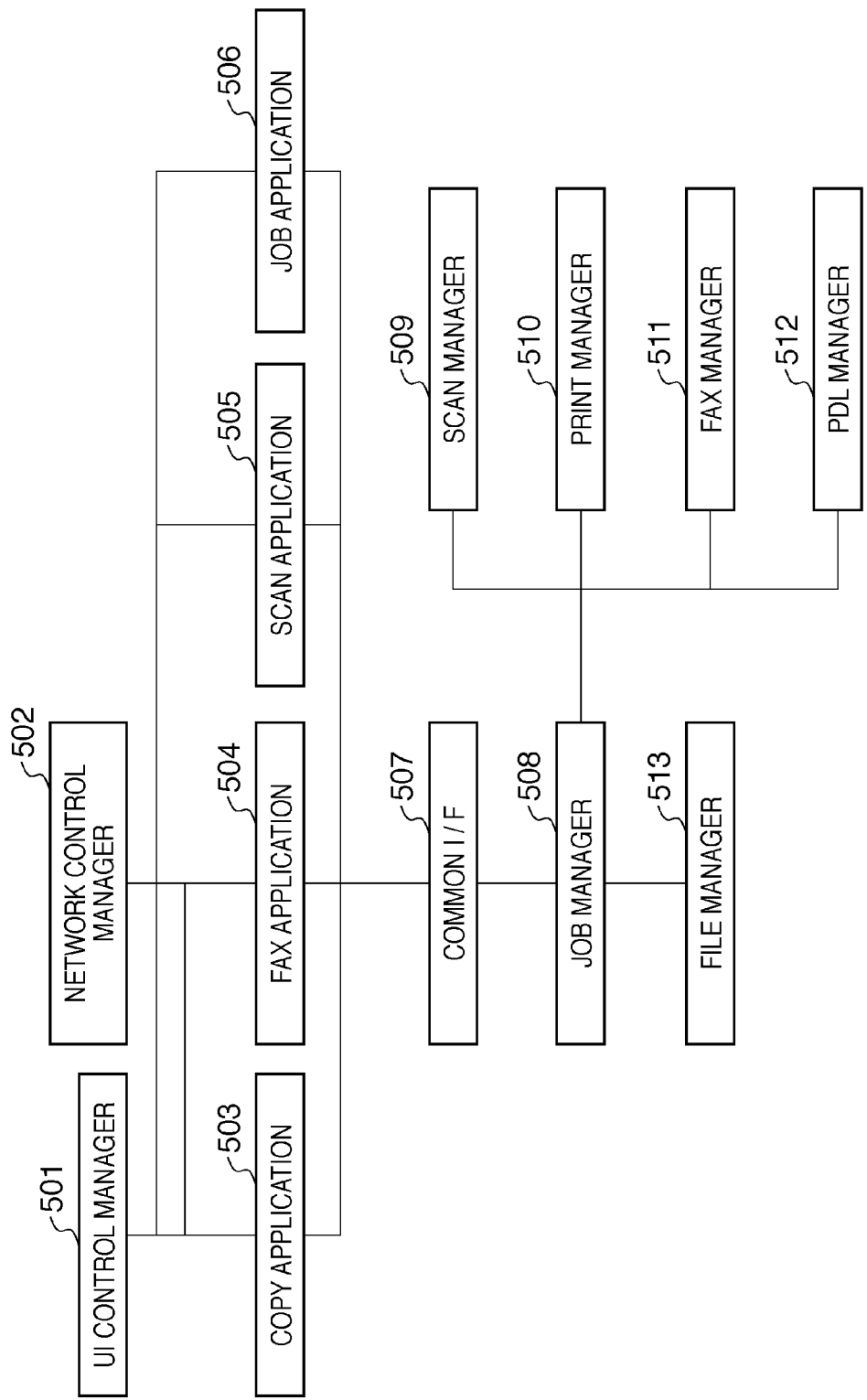
FIG. 4 is a block diagram describing a software configuration of the multi function peripheral according to the present embodiment.

FIG. 4 is a block diagram describing a software configuration of the multi function peripheral 30 according to the present embodiment. The software is stored in the large volume storage unit 305 of FIG. 3.

A UI control manager 501 is software for controlling the display unit 301 and the console unit 309. The UI control manager 501 transmits an instruction of the user to a module of a lower layer and displays information from a lower layer on a UI including the display unit 301 and the console unit 309. A network control manager 502 receives an instruction and information from the network 40 and transmits an instruction and information from the CPU 300 to the network 40. Reference numerals 503 to 505 denote applications that receive instructions from a UI control manager 501 and a network control manager 502 and that create job files for a job manager 508 to execute jobs to transmit the job files to the job manager 508. Reference numeral 503 denotes a copy application that executes a copy process. Reference numeral 504 denotes a fax application for facsimile transmission/reception. Reference numeral 505 denotes a scan application that reads a document. A job application 506 causes the job manager 508 to execute a job file stored in advance, based on an instruction from the UI control manager 501.

A common interface module 507 is a common interface that absorbs the device-dependent part of the job manager 508. The job manager 508 organizes job information received from the common interface module 507 and transmits the job information to a control manager attached to a lower layer device. In the case of a local copy, the job manager 508 activates a scan manager 509 and a print manager 510. In the case of PDL printing, such as LIPS and postscript, the job manager 508 activates a PDL manager 512, a file manager 513, and the print manager 510. In the case of facsimile transmission/reception by the fax application 504, the job manager 508 activates a FAX manager 511. In this way, the job manager 508 executes processes, such as activation, synchronization, and termination of the control managers, in accordance with the job. The job manager 508 also processes a job with a combination of a plurality of processes transmitted from the job application 506. The job manager 508 also controls error processing during job execution and records an operation log of job. The file manager 513 executes a process of saving image data or a job file used in a job in the large volume storage unit 305 and extracting image data or a job file from the large volume storage unit 305. The job manager 508 also controls processes such as a process of transmitting the data stored in the large volume storage unit 305 to the network 40.

FIG. 5 is a configuration diagram describing software that controls the entire information processing system and that operates on the server 20 according to the embodiment. The software corresponds to a program stored in the secondary storage unit 109 of the server 20 and is appropriately loaded on the RAM 101 of the server 20 and executed under the control of the CPU 100 of the server 20.

A main control section 600 controls the entire information processing system according to the embodiment and gives instructions and manages the components described below. A data transmission/reception section 601 receives a command issued by the user via a browser in the PC 10 or the multi function peripheral 30 and returns the result of the instruction of the main control section 600 to the PC 10 or the multi function peripheral 30. The data transmission/reception section 601 transmits a command to the multi function peripheral 30 depending on the instruction from the main control section 600. When the user accesses the information processing system via the browser in the PC 10 or the multi function peripheral 30, a session storage section 602 generates session information for indicating that the access is by the same user. The session storage section 602 further associates repeatedly used various information with the session information and holds the information until the user terminates (logout) accessing the information processing system or the session shuts down due to a timeout, etc. A web UI generation section 603 receives an instruction from the main control section 600 and generates web UI information (HTML) according to the status. The web UI information generated by the web UI generation section 603 is not limited to HTML, but may include a script language such as JavaScript.

A user information manipulation section 604 follows an instruction from the main control section 600 and performs operations, such as extracting and editing of information of users who can access the information processing system and of user attributes that are stored in the user information storage section 605. The management of the user information is not always carried out by the information processing system. Known Active Directory, LDAP, etc. may serve as the user information storage section 605 and manage the user information in cooperation with the user information manipulation section 604. A flow definition manipulation section 606 creates and edits flow definitions and also stores and deletes flow definition information to and from a flow definition/status storage section 607. The flow definition information is information defining sequential execution of some of the services provided by the multi function peripheral 30 and the server 20 in a series of flows.

FIG. 6 depicts a view illustrating an example of flow definition information in the information processing system according to the embodiment of the present invention. FIG. 6 will be described later.

As described, the flow definition information according to the present embodiment includes interface information for invoking services from the server 20 and information such as invocation order of services and data exchanged between services, in a format as shown for example in FIG. 6. The services denote usable functions related to data, usable in accordance with a request from the outside. Examples of the services include, without limitation, copy, print, scan, FAX transfer, email transmission, saving to a repository such as a database and a file system, OCR process, and noise removal process such as black spot removal.

A flow control section 608 controls sequential execution of a flow for executing services in accordance with an instruction from the main control section 600 and designated flow definition information. To start the flow, the flow control section 608 first issues a unique sequence ID for identifying the execution flow. In the execution of the service, the flow control section 608 definitely transfers, to the service, the sequence ID along with an execution instruction. Although the sequence ID may be in any form that allows unique identification, GUID or the like with extremely low possibility of being competitive to other systems is usually used. The flow control section 608 also monitors and manages the execution status of service. For example, the flow control section 608 stores, in the flow definition/status storage section 607, and manages information denoting which information is the currently executed flow definition information, which service in the flow definition information is currently executed, and when the service is started.

Furthermore, if an error occurs in the middle of the processing flow, then the flow control section 608 stores information at the occurrence of the error (target flow definition information, sequence ID, processing user information, information of service with the error, and error occurrence time) in the flow definition/status storage section 607.

A web application service section 609, a temporary data storage area 610, and an operation log storage section 611 are components constituting the "services" provided from the server 20. The components may exist in an external server as services. In that case, an instruction of the main control section 600 is transmitted to the external server via the data transmission/reception section 601. The web application service section 609 is an entity of processing of execution service. Data generated for the execution of service is stored in the temporary data storage area 610, and a log of internal operation is stored in the operation log storage section 611. A log collection analysis section 612 follows an instruction from the main control section 600 to collect an operation log specified by a specific sequence ID from a designated service and analyze the error status (such as confirmation of the cause and intermediate product). A service information confirmation section 613 inquires the multi function peripheral 30 and the server 20 for the capability and confirms details of the provided services. Service information that can be obtained is in a form as shown for example in FIG. 8 (details will be described later), and the information includes a host name, a list of provided services, interfaces of the services, input/ output conditions of the services, etc.

An example of the flow definition information of the information processing system according to the present embodiment will now be described with reference to FIG. 6.

Services to be invoked from the server 20 are defined by <service> tags, and a service invocation order (order attribute) and an invocation protocol (protocol attribute) are designated as attributes of the tags. Data exchanged for invoking the services is provided by <input> tags and <output> tags. Services invoked in the first to fourth order are defined in 701 to 704 in FIG. 6.

For example, reference numeral 701 denotes a definition of a service invoked first. The protocol is web "Service (protocol="WS")", and the service is a scan service (<name="SCAN"/>) provided by the multi function peripheral 30 (<location type="MFP"/>). In the example of FIG. 6, services of the multi function peripheral 30 (location type="MFP") and services provided by the server 20 (location type="Server") that are defined in the third and fourth order are mixed. However, the services do not have to be mixed in the definition, and there may be a definition listing only the services of the server 20.

An input parameter (<input> tag) 705 of the first service 701 designates A4 size and automatic resolution (auto). An output parameter (<output> tag) 706 defines that the result will be saved in a specified file path. The description of "scan*.tiff" in the <output> tag denotes that ordinals are placed in "*" when there are a plurality of files, and file names are outputted as "scan1.tiff, scan2.tiff, . . . ".

Basically, the flow definition information is stored in the flow definition/status storage section 607 and extracted for use. However, the flow control section 608 dynamically changes part of the information, such as <output> tags and the like, during the execution of the flow, to execute the flow. The flow control section 608 stores the dynamically changed flow definition information in the flow definition/status storage section 607 as execution status information of flow.

The service 702 invoked second in FIG. 6 is a black spot removal process by the multi function peripheral 30. The service 703 invoked third includes a character recognition process, which is for "scan*.tiff" after the black spot removal process, and a process, which is for forming the result into a text document (ocr*.txt), by the server 20. The service 704 invoked fourth is a process of saving the document (ocr*.txt) as a result of the character recognition by the server 20 in a Folder 1.

As described, the services used cooperatively in the information processing system are related to processing of data executed in accordance with a request from the outside, and the services are not particularly limited. However, interfaces are usually defined for comprehensive management by the information processing system. In the present embodiment, the service interfaces are defined in forms as shown in FIGS. 7A and 7B.

Figure 7A:
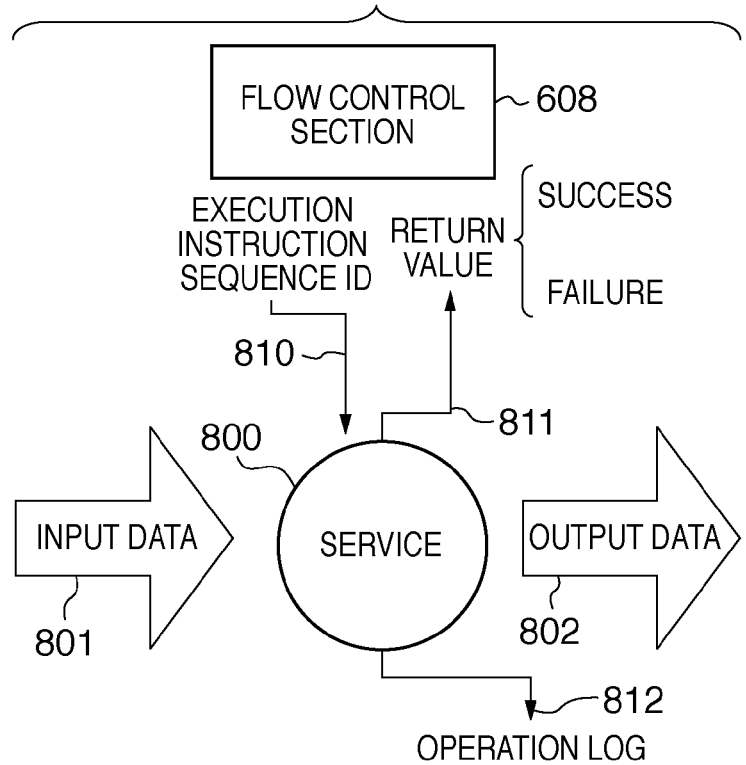
FIGS. 7A and 7B are conceptual diagrams of services used in the information processing system according to the present embodiment.
Figure 7B:
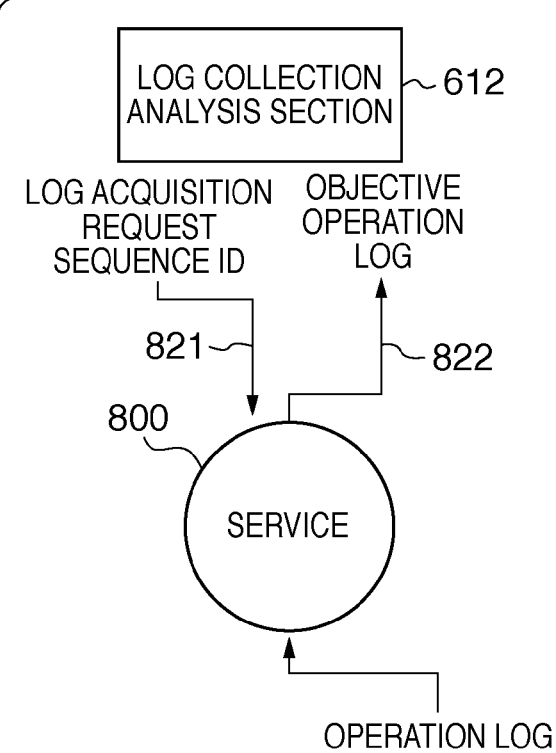

FIGS. 7A and 7B are conceptual diagrams describing services used in the information processing system according to the present embodiment.

In FIG. 7A, a service 800 receives a sequence ID 810 designated along with an execution instruction from the flow control section 608 to execute a process and returns a return value (success/failure) 811 to the flow control section 608. The service 800 is basically for converting input data 801 into output data 802 (however, any one of input data and output data may not exist). A plurality of items of data may be designated as the input data 801, while a plurality of items of data may be outputted as the output data 802. The return value 811 is basically returned after the completion of processing of all input data even if an error occurs in the middle of the data. Therefore, the return value 811 is not a result of individual input data, but is a result of the service. If there is even one item of input data that cannot be processed, a return value "failure" is usually returned.

The service 800 leaves a result of execution of individual data processing as an operation log 812.

As shown in FIG. 7B, the service 800 further comprises an interface that receives a sequence ID 821 transferred with a log request from the log collection analysis section 612 and that returns an objective operation log 822. The interface for returning the objective operation log 822 may not be included for each service, and only one interface can be included for the entire multi function peripheral or the entire server.

Figure 8:
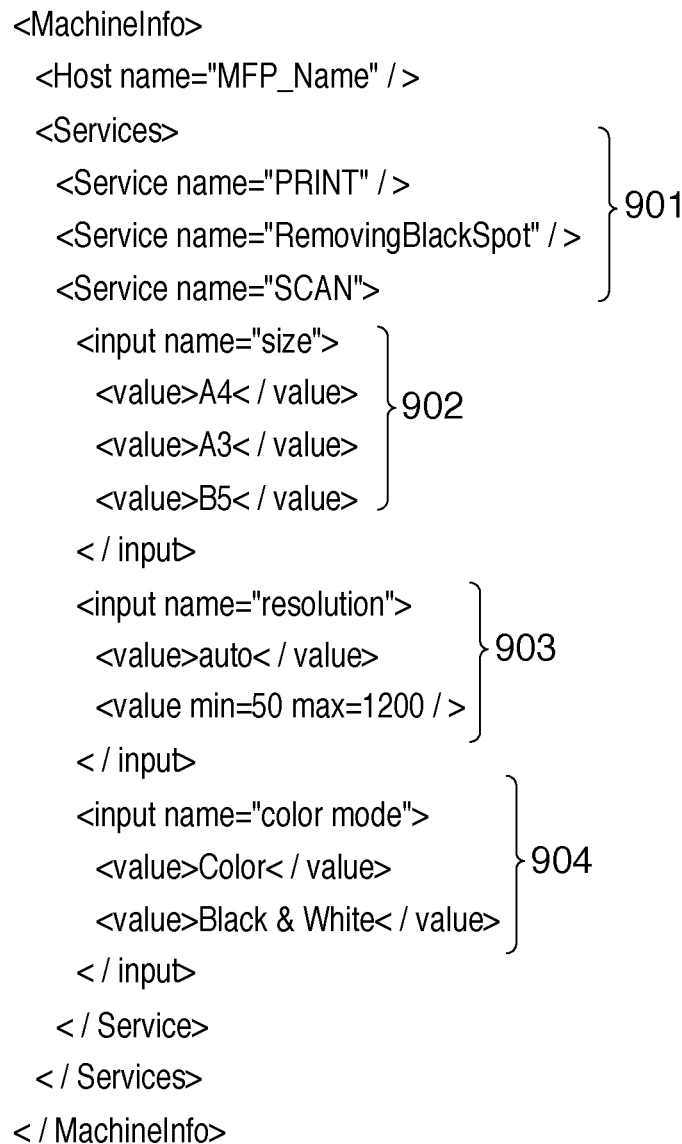
FIG. 8 depicts a view illustrating an example of service information that the server and the multi function peripheral cooperating in the information processing system can provide according to the embodiment.

FIG. 8 depicts a view illustrating an example of service information that can be provided by the server 20 and the multi function peripheral 30 cooperating in the information processing system according to the embodiment of the present invention.

The example describes capability related to a multi function peripheral (<Host name="MFP_Name"/>) with a host name "MFP_Name". Services 901 of printing (PRINT), removal of block points (RemovingBlackSpot), and scanning (SCAN) are disclosed to the outside.

Capabilities of the services are also described. In the scan service, reference numeral 902 denotes that the paper size (<input name="size">) is one of A4, A3, and B5. Reference numeral 903 defines that the resolution <input name="resolution"> is automatically controlled "auto" or controlled in a range of 50 to 1200 dpi. Reference numeral 904 denotes that "Color" and "Black & White" can be designated as a color mode.

The service information can be obtained from all service providers associated with the information processing system and can be obtained not only from the multi function peripheral, but also from a web server that provides services in the embodiment. As shown in FIG. 8, although the system is designed to allow each of the server and the multi function peripheral to obtain the service information in the present embodiment, the services may be designed to individually provide the information.

FIG. 9 depicts a view illustrating an example of an operation log that can be obtained from the services in the information processing system according to the present embodiment. The operation log includes information, such as process name, occurrence time, target data, sequence ID, result (success or failure), cause code, and detailed message.

The format of the operation log is the one when the operation log is obtained from the services, and the storage format may be in any form in the multi function peripheral and the web application server. If the operation log is stored in a different format, the service side converts the operation log into a data format shown in FIG. 9 when the operation log is extracted.

The operation log of FIG. 9 describes that the second page with sequence ID "10" (processed second with the same sequence ID) has failed in a character recognition (OCR) process because a color image cannot be handled (cause code is "2"). It can also be recognized that the first page with sequence ID "11" has failed due to a communication error (cause code is "−1"). The cause codes will be described with reference to FIG. 10.

FIG. 10 depicts a view illustrating an example of cause codes that can be obtained as an operation log of the information processing system according to the embodiment of the present invention. The cause codes listed here indicating causes of error are used to determine conditions required to replace data. Therefore, only parameter factors allowing changes in the parameters during input in the multi function peripheral are listed. Other causes of error (such as network error and I/O error) are classified into and handled as unknown errors. In FIG. 10, the cause codes include, from the top, "Not Color", "Not Black & White", "Too Big Size", "Too Small Size", "Too High Resolution", "Too Low Resolution", "Not PDF", and "Not Image".

Processes in the steps of the information processing system according to the embodiment of the present invention will be specifically described with reference to FIGS. 11 to 14.

Figure 11:
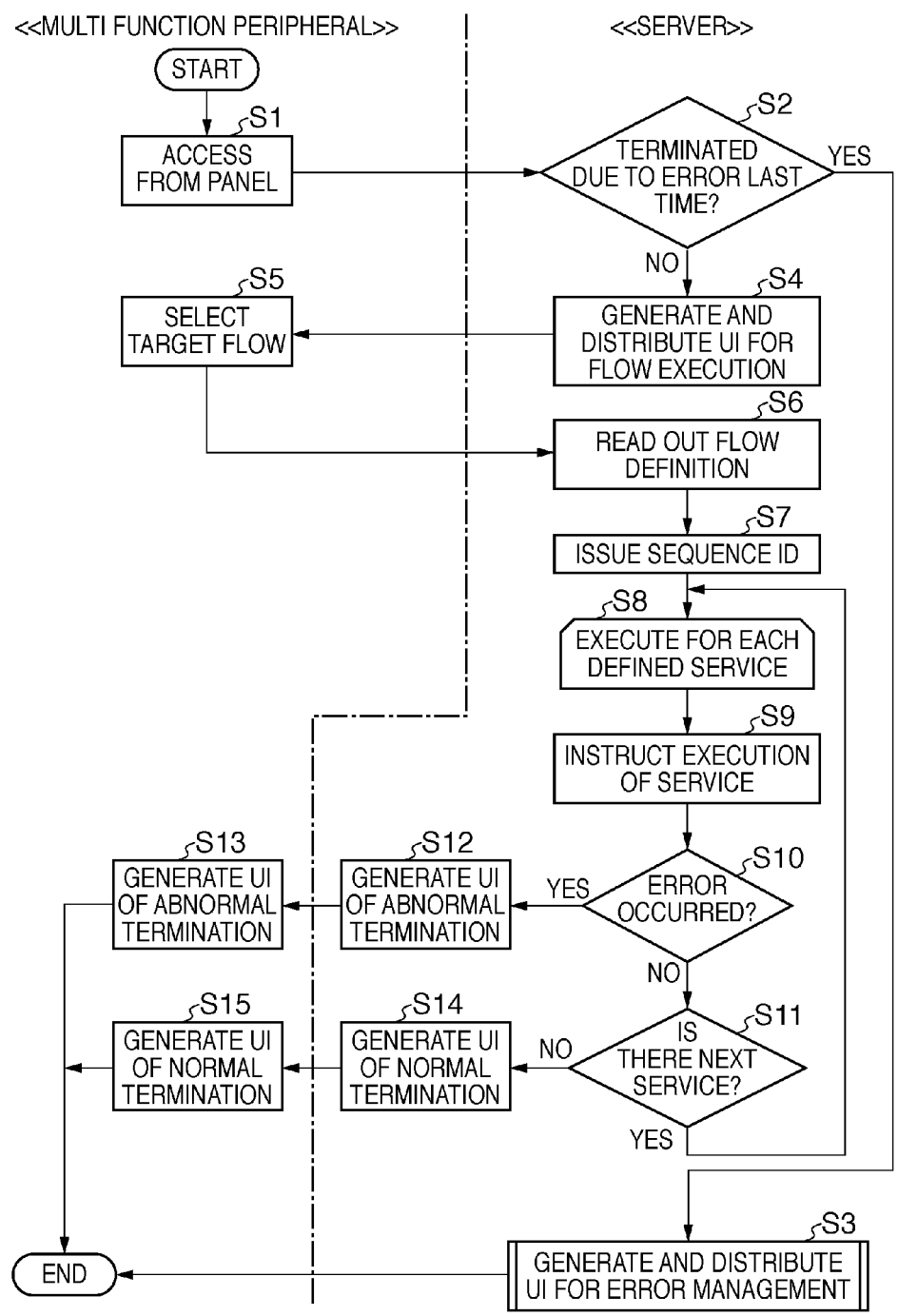
FIG. 11 is a flow chart describing process of the information processing system in which the multi function peripheral and the server cooperate and execute a processing flow of data inputted from the multi function peripheral according to present embodiment.

FIG. 11 is a flow chart describing process of the information processing system in which the multi function peripheral and the server cooperate and execute a processing flow of data inputted from the multi function peripheral according to present embodiment. In FIG. 11, the process executed by the multi function peripheral 30 is realized by the CPU 300 executing the process in accordance with a program stored in the memory 304. The process executed by the server 20 is realized by the CPU 100 executing the process in accordance with a program loaded to the RAM 101. The same applies to the flow charts described below.

In step S1, the user operates the console unit 309 of the multi function peripheral 30 to log in and accesses the server 20.

In step S2, the server 20 receives the access request (processing request), and the flow control section 608 determines whether or not the user has terminated the process due to an error during the last access based on the information stored in the flow definition/status storage section 607. If the flow control section 608 determines that the process has been terminated last time due to an error, the process proceeds to step S3, and UI information for managing the error is generated and distributed to the multi function peripheral 30. The process of step S3 will be described in detail with reference to the flow chart of FIG. 12.

On the other hand, if the flow control section 608 determines that the process has not been terminated the last time due to an error in step S2, the process proceeds to step S4, and the web UI generation section 603 generates UI information including items for executing the already defined flow definition information and transmits the UI information to the multi function peripheral 30. To express the UI including items for executing the defined flows, the definition flows may be displayed with buttons, and the user may press a button to execute a definition flow. Alternatively, a list of the defined flows and buttons for executing a flow selected in the list may be displayed. Although there are various methods, the methods are not particularly limited.

In the present embodiment, the access request from the multi function peripheral 30 to the server 20 performed in step S1 is designed to be performed by HTTP communication. This allows the server 20 to determine whether the accessing source is the multi function peripheral or the PC 10 based on the HTTP header in the access request. If the accessing source is not the multi function peripheral 30, the flow in which the service provided by the multi function peripheral 30 is defined as the service to be executed first may not be displayed on the UI. Although the accessing source is usually determined using User-Agent information in the HTTP header, etc., the accessing source may be determined as the multi function peripheral in case of a specific IP address or a subnet address. The determination method is not limited.

In step S5, the multi function peripheral 30 displays the display unit 301 of the multi function peripheral 30 based on the distributed UI information. The user B selects an intended flow with the UI for instructing the execution. In accordance with the instruction of the user B, the multi function peripheral 30 notifies the server 20 of an event corresponding to the operation of the user B.

In step S6, the server 20 receives the notified event. The flow control section 608 then specifies and reads out the definition of the flow corresponding to the event from the flow definition/status storage section 607. The process proceeds to step S7, and a sequence ID that is an ID indicative of a process defined in one piece of flow definition information is issued to the individual services of the flow definition information specified in step S6. The services are executed in accordance with the flow definition information in steps S8 to S10. More specifically, in step S9, the flow control section 608 outputs an execution instruction to the individual services defined in the flow definition information while designating the sequence ID, the input data, and the output data. In step S10, it is determined whether or not an error occurs during the execution of service. In step S11, steps S8 to S11 are repeated until all services are executed. More specifically, in step S11, the flow control section 608 proceeds to step S8 if the next service to be executed exists. The flow control section 608 specifies the service to be executed next from the flow definition information in execution and repeats the processes of steps S9 to S11.

The process proceeds to step S12 if the flow control section 608 detects an occurrence of error in step S10, and the flow control section 608 stores error status information in the flow definition/status storage section 607 as described above. The web UI generation section 603 then generates UI information indicative of the abnormal termination and distributes the UI information to the multi function peripheral 30. In step S13, the multi function peripheral 30 receives the distributed UI information and displays the UI information on the display unit 301 to present the UI information to the user.

In step S11, if all services are normally finished, the process proceeds to step S14. The web UI generation section 603 generates UI information of normal termination and distributes the UI information to the multi function peripheral 30. In step S15, the multi function peripheral 30 displays information on the display unit 301 based on the UI information for the user to see.

Figure 12:
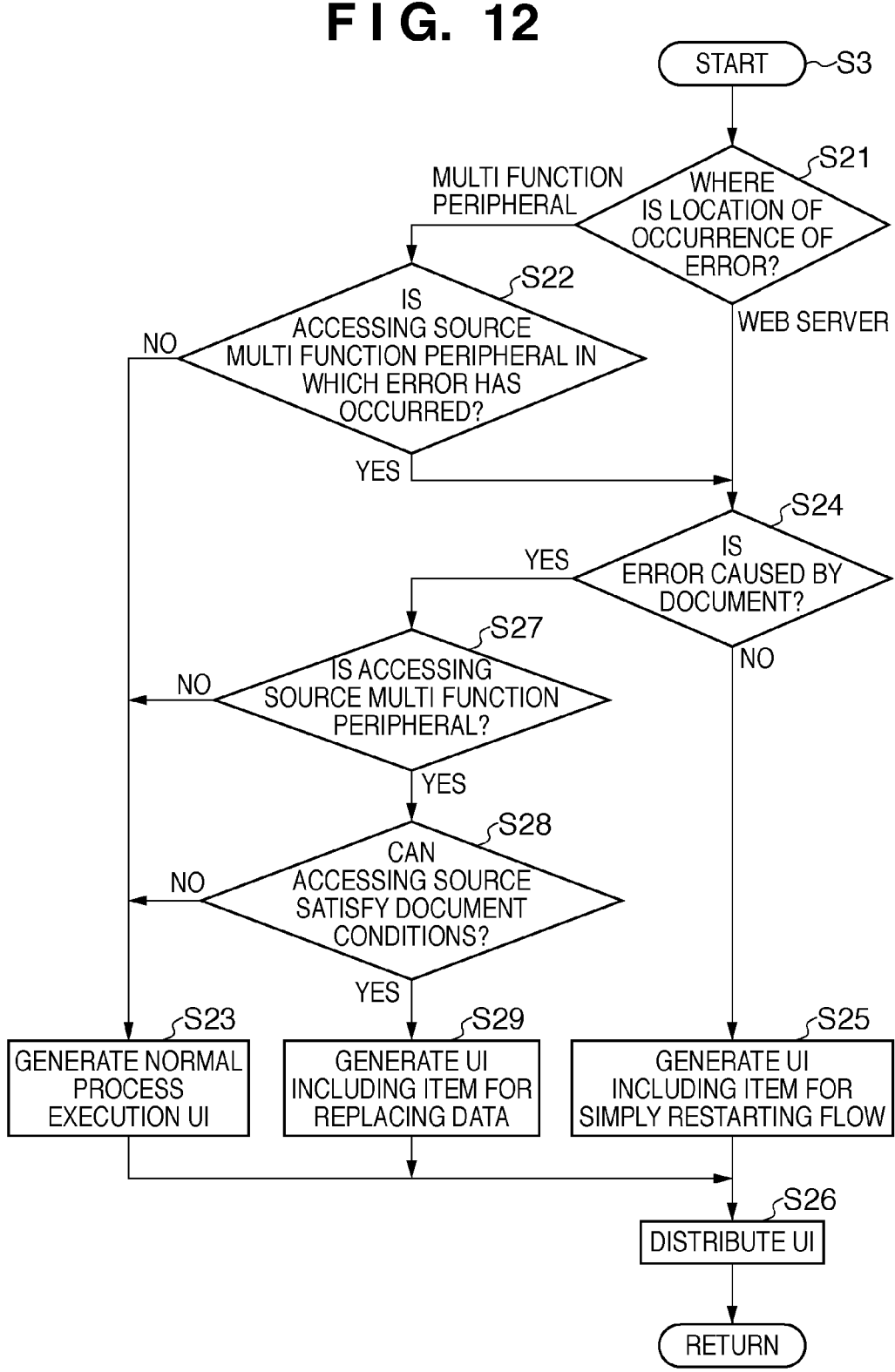
FIG. 12 is a flow chart describing process of the information processing system when a process is terminated last time due to an error when there is an access request from the multi function peripheral in step S3.

FIG. 12 is a flow chart describing a process when a process is terminated (or interrupted) last time due to an error when there is an access request from the multi function peripheral 30 in step S3 of FIG. 11.

In step S21, the flow control section 608 determines whether the service provider, in which an error has occurred the last time, is the multi function peripheral 30 or the server 20, based on the error status information stored in the flow definition/status storage section 607. If the flow control section 608 determines that the service provider is the multi function peripheral 30 in step S21, the process proceeds to step S22. The flow control section 608 determines whether or not the accessing multi function peripheral that is requesting access this time is the same as the multi function peripheral that has provided the service in which an error has occurred. Although the determination method is not particularly limited, the information of the erroneous service stored as the error status information includes information of the service provider in the present embodiment. Therefore, the determination is designed to be made by comparing the contents (such as IP addresses) of the HTTP headers transmitted during the access requests. If the flow control section 608 determines in step S22 that the access is not from the same multi function peripheral, the process proceeds to step S23. This denotes that the intermediate generation data generated in the flow of the last time is stored in a multi function peripheral different from the accessing multi function peripheral of this time. In such a situation, the following reasons can be estimated.

(I) The user does not intend to restart the error processing of the last time.

(II) The multi function peripheral used last time cannot be currently used for some reason.

Therefore, the process proceeds to step S23, and the UI for restarting the process is not displayed on the multi function peripheral 30. The web UI generation section 603 generates UI information for normal flow execution as in step S4 of FIG. 11, and the process proceeds to UI transmission (distribution) of step S26.

On the other hand, if the flow control section 608 determines in step S21 that the provider of the service, in which an error has occurred the last time, is the server 20 or determines in step S22 that the accessing multi function peripheral of this time and the multi function peripheral in which an error has occurred the last time are the same, the process proceeds to step S24. In step S24, the flow control section 608 determines whether the cause of the error is in the document. To make the determination, the log collection analysis section 612 transfers the sequence ID to the erroneous service as shown in FIG. 7B to request to obtain the log and obtains the objective operation log corresponding to the sequence ID. The log collection analysis section 612 that has obtained the operation log checks the cause code included in the operation log. The log collection analysis section 612 can compare the cause code with the cause code list as shown in FIG. 10 and specifies that the cause is in the document if the cause code is not "unknown". Therefore, the process proceeds from step S24 to step S27. Otherwise, the process proceeds from step S24 to step S25. In step S25, the web UI generation section 603 generates UI information including an item for restarting the process from the service in which the error has occurred the last time. The process proceeds to step S26, and the UI information including the item for restarting the process is transmitted to the multi function peripheral 30.

In step S27, the flow control section 608 determines whether the accessing source is the multi function peripheral 30 or the PC 10 based on the HTTP header of the access request, etc. If the access request source is the PC 10, an alternative document cannot be read out. Therefore, the process proceeds to step S23, and UI information for normal process execution is generated.

On the other hand, if the flow control section 608 determines that the accessing source is the multi function peripheral in step S27, the process proceeds from step S27 to step S28 to confirm the capability of the multi function peripheral that is the accessing source. In step S28, the service information confirmation section 613 issues a capability confirmation request to check the capability of the accessing multi function peripheral. The service information confirmation section 613 obtains service information as shown for example in FIG. 8 as a response to the capability confirmation request, and from the information, specifies the service executed first in the flow definition information executed last time and the capability of the service.

For example, according to the operation log shown in FIG. 9, it can be recognized that the second page must be black and white. On the other hand, the service executed first is "SCAN" in the flow definition information of FIG. 6, and it can be recognized from the service information of FIG. 8 that black and white scan is possible in the scan service of the multi function peripheral 30. Therefore, it can be determined that the multi function peripheral 30 that provides the service information of FIG. 8 can satisfy the document conditions (cause is resolved), and the process proceeds to step S29.

Specific document conditions include the following conditions.

(A) Presence of scan mode of color/black and white.
(B) Number of colors can be scanned.
(C) Resolution can be scanned.
(D) Document size can be scanned.
(E) Availability for outputting scan images in a specific format (such as PDF).
(F) Whether the multi function peripheral has the scan function.

Conditions (A) to (F) are combined in some cases.

On the other hand, if it is determined in step S28 that the accessing multi function peripheral cannot not satisfy the document conditions, the flow definition information is not expected to be completed even if the document data is replaced on the multi function peripheral. Therefore, the process proceeds to step S23, and UI information for normal process execution is generated. If it is determined in step S28 that the accessing multi function peripheral can satisfy the document conditions, the process proceeds to step S29. The flow control section 608 generates UI information including a data replacement item and proceeds to step S26. In the UI information including the data replacement item, the following items (1) to (4) are included or associated.

(1) Instruct reading out of page data, in which an error has occurred the last time, for the data reading service (to maintain the continuity with the document in which an error has occurred the last time).

(2) Setting of additional required document condition predicted from the cause of error for the data reading service (such as switching of color/black and white, change in resolution, and change in document size).

(3) Setting of service execution definition up to the service, in which an error has occurred the last time, of the target flow definition information, for the read out data (determine normal data until the occurrence of error and handling of the data).

(4) Setting of service execution definition (unprocessed service execution definition) of services that are not executed last time (services after the service with the error), for the data processed in (3) and the data normally completed last time.

The items (1) to (4) associated with the UI information including the data replacement item are designed to be expressed as another item of flow definition information based on the original flow definition information as shown in FIG. 16 in the present embodiment. However, the information may be held as separate item of information, or the relationship of the item of information may be held. For example, the items (1) to (3) of the information may be generated as one item of flow definition information, and the information and the flow definition information executed last time may be stored in association with the number of service order with the error (in the flow definition/status storage section 607).

The flow control section 608 distributes the UI information generated in one of steps S23, S25, and S29 to the accessing multi function peripheral or PC in step S26.

FIG. 16 depicts a view illustrating an example of data replacement flow definition information in the information processing system according to the embodiment of the present invention. In the example described here, the server 20 generates UI information for managing the error and distributes the UI information to the multi function peripheral 30 after an error in the second document with sequence ID "10" (cause code "2") of FIG. 9.

As is clear by comparing FIGS. 16 and 6, third and fourth services 1703 and 1704 provided by the server 20 are the same as 703 and 704 of FIG. 6 and are not changed.

Reference numeral 1701 denotes a definition of a service invoked first. The protocol is Web Service (protocol="WS"), and the service is a scan service (<name="SCAN"/>) provided by a multi function peripheral (<location type="MFP"/>). While A4 size and automatic resolution (auto) are designated for input parameters (<input> tags) in FIG. 6, a color mode (Color Mode) and a black and white mode (Black & White) are set in 1705 of FIG. 16. This is because an error has occurred in FIG. 9 due to a reason that "Color Image Cannot Be Processed" in the reading of the second document.

In an output parameter (<output> tag) 1706, a file name "scan2.tiff" indicative of the second document is described. Therefore, the target file is changed to "scan2.tiff" in the black spot removal of a second service 1702, and the file as a result of the change is also changed to "result2.tiff".

Figure 13:
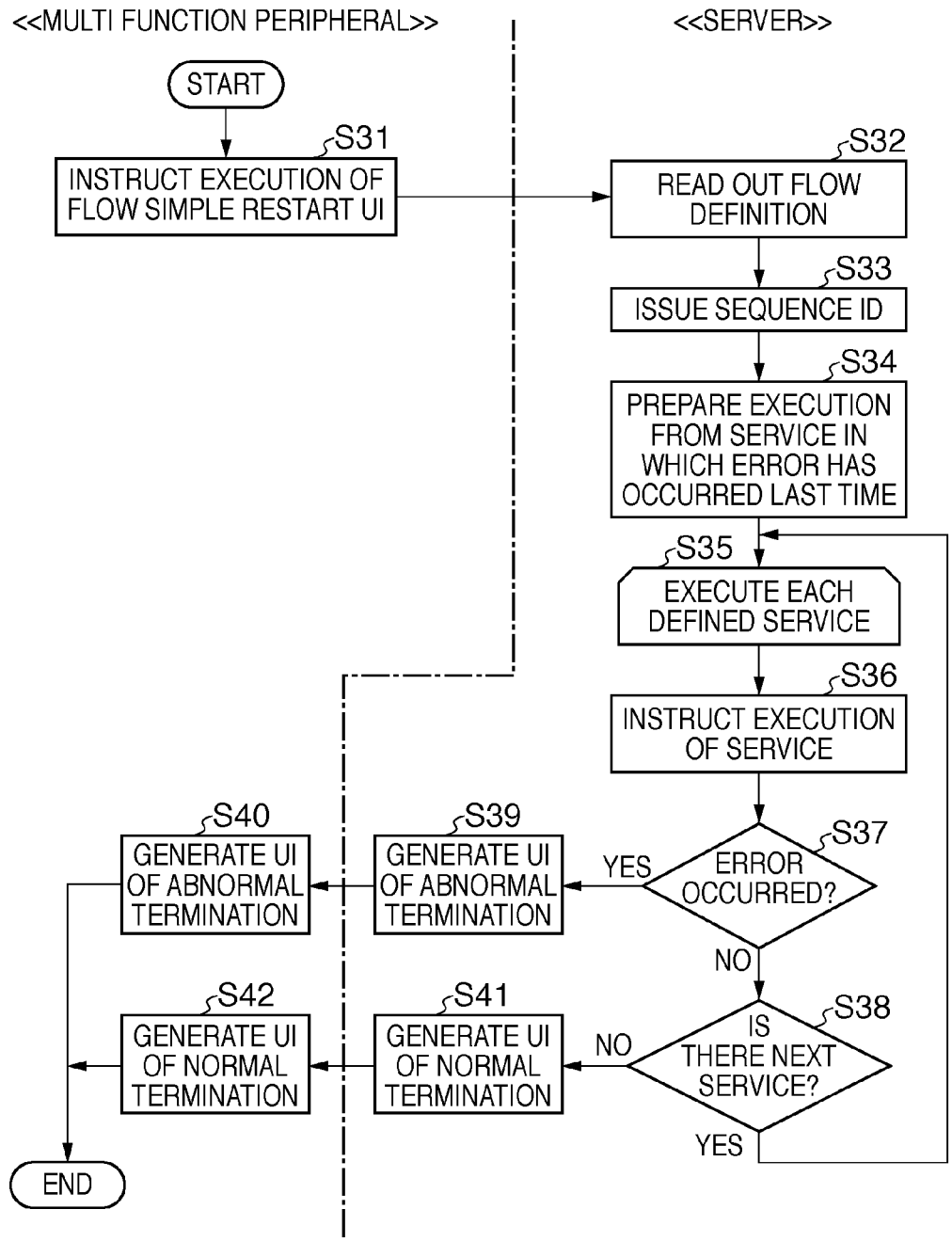
FIG. 13 is a flow chart describing process of the information processing system when an accessing multi function peripheral or PC issues a display/execution instruction of a flow restart UI after UI information including an item for simply restarting a flow generated in step S25 is distributed in step S26.

FIG. 13 is a flow chart describing process of the information processing system when the accessing multi function peripheral 30 or PC 10 issues a display/execution instruction of a flow restart UI after UI information including an item for simply restarting the flow generated in step S25 of FIG. 12 is distributed in step S26.

In step S31, when the user uses an accessing terminal (PC 10 or multi function peripheral 30) to display a flow restart UI and perform an operation of an execution instruction in accordance with the UI information including the item for simply restarting the flow, an event corresponding to the execution instruction is notified to the server 20.

In step S32, the server 20 receives the notified event, and the flow control section 608 reads out the flow definition information in which an error has occurred the last time. The process proceeds to step S33, and the flow control section 608 issues a new sequence ID for reprocessing. The process proceeds to step S34, and the flow control section 608 specifies the service, in which an error has occurred the last time, from the information stored in the flow definition/status storage section 607. Skipping the service definition information before at the time when the error occurred the last time, among the flow definition information read out in step S33, and the execution is started from that service, in which the error has occurred the last time. Processes of steps S35 to S42 are the same as the processes of steps S8 to S15 of FIG. 11, and the description will not be repeated.

Figure 14:
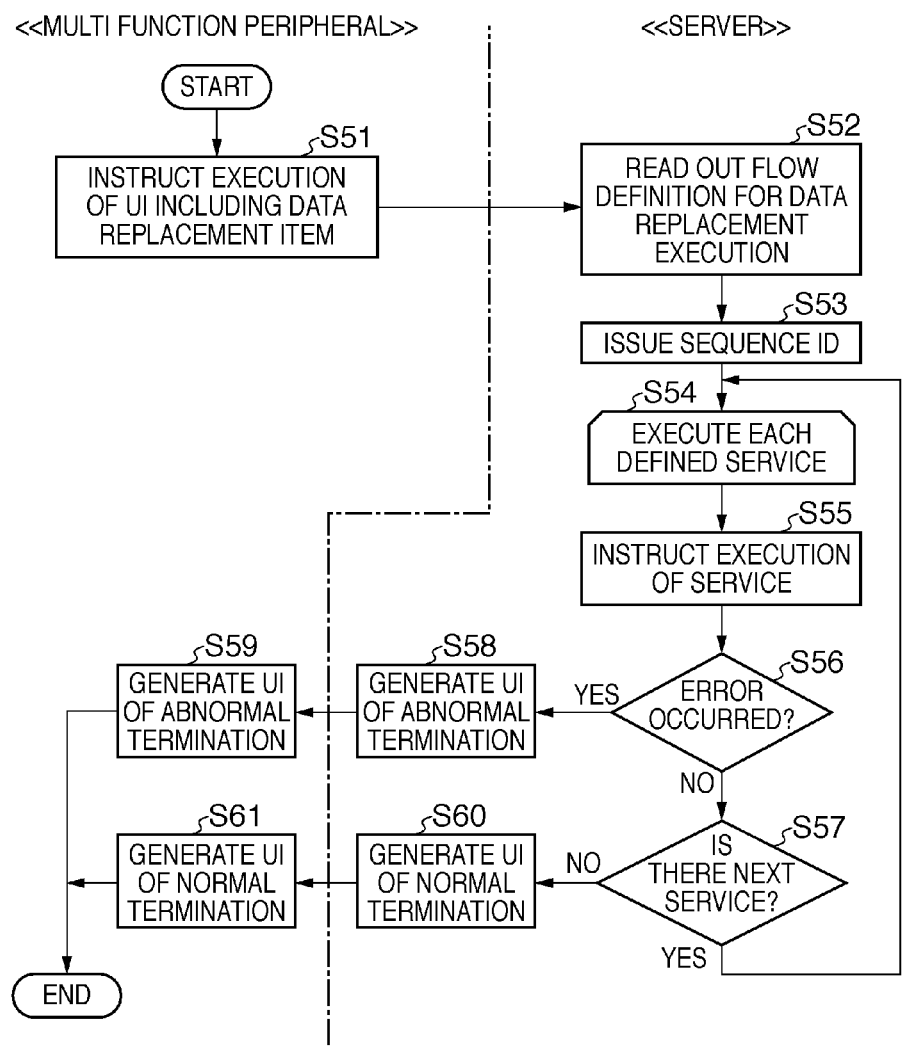
FIG. 14 is a flow chart describing process of the information processing system in which the multi function peripheral and the server cooperate and execute a processing flow of data inputted from the multi function peripheral according to the present embodiment.

FIG. 14 is a flow chart describing process of the information processing system in which the multi function peripheral and the server cooperate and execute a processing flow of data inputted from the multi function peripheral according to the present embodiment. The process shows that the server 20 transmits the UI information including the data replacement item generated in step S29 in FIG. 12 to the multi function peripheral 30 and that a data replacement item is inputted in the multi function peripheral 30. More specifically, the process is equivalent to when the cause of error of the last time is in the document conditions in the server 20 or the multi function peripheral 30, and the multi function peripheral as an accessing source this time (including when the multi function peripheral is the same as the multi function peripheral in which the error has occurred) satisfies the document conditions.

In step S51, when the user uses the console unit 309 of the multi function peripheral 30 to perform an execution instruction operation based on the UI information including the data replacement item, an event corresponding to the execution instruction operation is notified to the server 20.

In step S52, the server 20 receives the notified event, and the flow control section 608 reads out the flow definition information for executing data replacement generated in step S29 as shown in FIG. 16. The process proceeds to step S53, and the flow control section 608 issues a new sequence ID for reprocessing. In steps S54 to S61, the services are sequentially executed in accordance with the flow definition information. Processes of steps S54 to S61 are the same as steps S8 to S15 of FIG. 11, and the description will not be repeated.

Figure 15A:
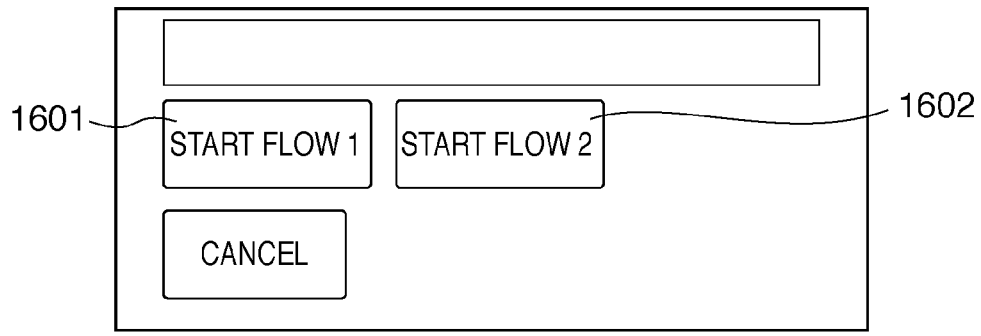
FIGS. 15A to 15C depict views illustrating an example of UI information distributed when the information processing system according to the present embodiment is accessed.
Figure 15B:
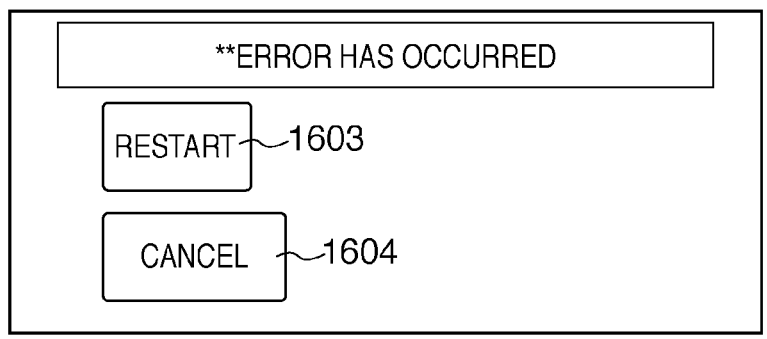
Figure 15C:
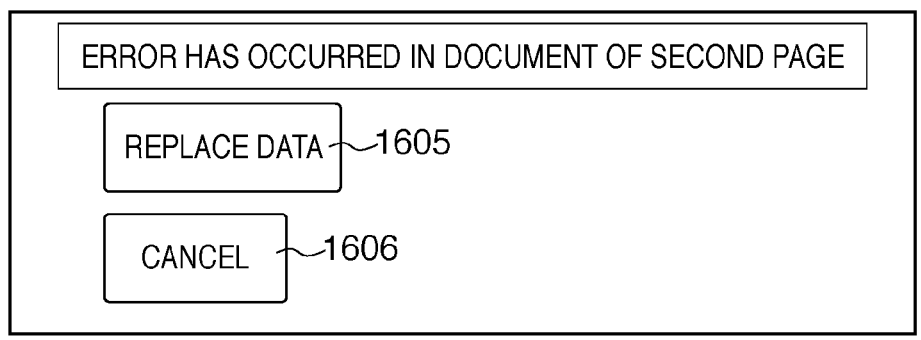

FIGS. 15A to 15C depict views illustrating an example of UI information distributed from the server 20 to the multi function peripheral or the PC when the information processing system is accessed according to the present embodiment.

FIG. 15A shows an example of normal processing execution UI generated by the server 20 and distributed to the multi function peripheral 30 in step S4 of FIG. 11, or generated in step S23 of FIG. 12 and distributed to the multi function peripheral 30 or the PC 10 in step S26. In the example, two flows, flows 1 and 2, are prepared, and buttons 1601 and 1602 for instructing the execution of the flows are displayed on the UIs, respectively. When any one of the buttons is pressed to instruct the execution of the flow, the processes after step S2 by the server 20 are executed from step S1 of FIG. 11.

FIG. 15B illustrates an example of the UI including the item for restarting the flow generated in step S25 of FIG. 12 and distributed in step S26. In this case, the error is caused by the server 20, and the cause of the error is not the document conditions. Therefore, a message "Error Has Occurred" indicating an occurrence of an error and a restart button 1603 for instructing the restart of the flow are displayed. When a cancel button 1604 of FIG. 15B is pressed, the screen switches to a UI screen of FIG. 15A. If the restart button 1603 is instructed, the processes after step S32 of FIG. 13 by the server 20 are activated.

FIG. 15C illustrates an example of the UI including the data replacement execution item generated in step S29 of FIG. 12 and distributed in step S26. In this case, the location of the occurrence of error is in the document conditions in the multi function peripheral 30 or the server 20, and the accessing source this time is a multi function peripheral. Therefore, whether the data will be replaced can be selected. Thus, a data replacement button 1605 for instructing the execution of data replacement is displayed in the example. If a cancel button 1606 is pressed, the screen switches to a UI screen shown in FIG. 15A.

In FIG. 15C, an error "Color Image Cannot Be Processed" has occurred in the second page of document with sequence ID "10" of FIG. 9, and "Error Has Occurred in Document of Second Page" is displayed. If the "Replace Data" button 1605 is pressed, the server 20 executes the processes after step S52 of FIG. 14. The data of document read by the multi function peripheral 30 is replaced with data of the document of the second page with error, in accordance with the flow definition information of FIG. 16, and the data is processed.

As described, according to the present embodiment, a process can be efficiently restarted without rereading documents as much as possible when an error occurs during the execution of a flow or when the process is canceled in the information processing system.

Suitable execution units (such as buttons) can be presented to the user in accordance with the location of the occurrence of error, cause, conditions required for input data, capability of accessing source, etc. This makes it possible to restart the process without confusing the user.

Furthermore, an execution unit reflecting required conditions is presented to replace data. Therefore, it is more convenient for the user as the user can restart the process according to the UI without checking the conditions required for the restart process.

(Other Embodiment)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-063237, filed Mar. 16, 2009, which is hereby incorporated by reference herein in its entirety.

What is claimed is:

1. A server which communicates with an image processing apparatus via a network and performs a process in cooperation with the image processing apparatus, said server comprising:

a storage unit that stores flow definition information defining a flow of a process executed in cooperation with the image processing apparatus;

a transmission unit that determines whether or not a processing request received from the image processing apparatus is issued after an occurrence of an error, and transmits, to the image processing apparatus, UI information for instructing the execution of a process in accordance with the flow definition information stored by said storage unit, which defines a flow of the process according to the processing request when the processing request is not issued after the occurrence of the error;

an execution control unit that controls the image processing apparatus to cooperate with said server to execute the process in accordance with the flow definition information;

a specifying unit that specifies a location in which an error has occurred and a cause of the error, when a processing request received from the image processing apparatus is issued after the occurrence of the error;

a flow definition unit that defines a flow of a process in accordance with the processing request after the occurrence of the error based on the location in which the error has occurred, and the cause of the error specified by said specifying unit;

a UI transmission unit that transmits UI information for instructing the execution of the process defined by said flow definition unit to the image processing apparatus; and a control unit that controls the execution of the process corresponding to the processing request after the occurrence of the error in accordance with the process defined by said flow definition unit based on information instructed by the image processing apparatus based on the UI information.

2. The server according to claim 1, wherein said flow definition unit defines the flow of the process to restart a process interrupted by the error if the error is not caused by a document processed by the image processing apparatus.

3. The server according to claim 1, wherein, when the location in which the error has occurred is the image processing apparatus, the image processing apparatus issues the processing request after the occurrence of the error, and when the error is caused by a document processed by the image processing apparatus, said flow definition unit defines the flow of the process to replace the document in which the error has occurred on the condition that the image processing apparatus has resolved the cause of the error.

4. The server according to claim 1, wherein said flow definition unit further comprises a unit that transmits, to an apparatus, UI information for instructing the execution of a process in accordance with flow definition information which defines a flow of a process according to a processing request and which is stored by said storage unit, when the information processing apparatus issuing the processing request after the occurrence of the error is different from the location in which the error has occurred.

5. The server according to claim 1, further comprising a memory unit that associates and stores information regarding the process in which the error has occurred with the cause of the error.

6. An information processing system in which at least a server and an image processing apparatus communicate via a network, and said server and said image processing apparatus cooperate to execute a process, said server comprising:

a storage unit that stores flow definition information defining a flow of a process executed in cooperation with said image processing apparatus ;

a transmission unit that determines whether or not a processing request received from the image processing apparatus is issued after an occurrence of an error, and transmits, to the image processing apparatus, UI information for instructing the execution of a process in accordance with the flow definition information stored by said storage unit, which defines a flow of the process according to the processing request when the processing request is not issued after the occurrence of the error;

an execution control unit that controls the image processing apparatus to cooperate with said server to execute the process in accordance with the flow definition information;

a specifying unit that specifies a location in which an error has occurred and a cause of the error, when the processing request received from the image processing apparatus is issued after the occurrence of the error;

a flow definition unit that defines a flow of a process in accordance with the processing request after the occurrence of the error based on the location in which the error has occurred and the cause of the error specified by said specifying unit;

a UI transmission unit that transmits UI information for instructing the execution of the process defined by said flow definition unit to the image processing apparatus; and a control unit that controls the execution of the process corresponding to the processing request after the occurrence of the error in accordance with the process defined by said flow definition unit based on information instructed by the image processing apparatus based on the UI information, and said image processing apparatus comprising:

an operation unit for a user to input an instruction based on the UI information; and an issuance unit that issues a processing request to the server in accordance with the instruction of the user inputted via the operation unit.

7. A control method of an information processing system in which at least a server and an image processing apparatus communicate via a network, and the server and the image processing apparatus cooperate to execute a process, the control method comprising:

a determination step for the server to determine whether or not a processing request received from the image processing apparatus is issued after an occurrence of an error;

a transmission step for the server to transmit to the image processing apparatus, UI information which is for instructing the execution of a process in accordance with flow definition information defining a flow of the process according to the processing request, when it is determined in said determination step that the processing request is not issued after the occurrence of the error;

an execution control step for the server to control the image processing apparatus to cooperate with the server to execute the process in accordance with the flow definition information;

a specifying step for the server to specify a location in which an error has occurred and a cause of the error when it is determined in said determination step that a processing request received from the image processing apparatus is issued after the occurrence of the error;

a flow definition step for the server to define a flow of a process in accordance with the processing request after the occurrence of the error based on the location in which the error has occurred, and the cause of the error specified in said specifying step;

a UI transmission step for the server to transmit UI information for instructing the execution of the process defined in said flow definition step to the image processing apparatus;

an issuance step for the image processing apparatus to cause a user to input an instruction based on the UI information to issue a processing request to the server in accordance with the instruction of the user; and a control step for the server to control the execution of the process corresponding to the processing request after the occurrence of the error in accordance with the process defined in said flow definition step based on information instructed by the image processing apparatus based on the UI information.

8. A non-transitory computer-readable storage medium storing an executable program for causing a computer to execute a method of an information processing system in which at least a server and an image processing apparatus communicate via a network, and the server and the image processing apparatus cooperate to execute a process, said method comprising:

a determination step for the server to determine whether or not a processing request received from the image processing apparatus is issued after an occurrence of an error;

a transmission step for the server to transmit to the image processing apparatus, UI information which is for instructing the execution of a process in accordance with flow definition information defining a flow of the process according to the processing request, when it is determined in said determination step that the processing request is not issued after the occurrence of the error;

an execution control step for the server to control the image processing apparatus to cooperate with the server to execute the process in accordance with the flow definition information;

a specifying step for the server to specify a location in which an error has occurred and a cause of the error when it is determined in said determination step that a processing request received from the image processing apparatus is issued after the occurrence of the error;

a flow definition step for the server to define a flow of a process in accordance with the processing request after the occurrence of the error based on the location in which the error has occurred, and the cause of the error specified in said specifying step;

a UI transmission step for the server to transmit UI information for instructing the execution of the process defined in said flow definition step to the image processing apparatus;

an issuance step for the image processing apparatus to cause a user to input an instruction based on the UI information to issue a processing request to the server in accordance with the instruction of the user; and a control step for the server to control the execution of the process corresponding to the processing request after the occurrence of the error in accordance with the process defined in said flow definition step based on information instructed by the image processing apparatus based on the UI information.

* * * * *